(12) United States Patent
Ando

(10) Patent No.: US 12,384,335 B2
(45) Date of Patent: Aug. 12, 2025

(54) VEHICLE CONTROL SYSTEM

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 91 days.

(21) Appl. No.: 18/535,017

(22) Filed: Dec. 11, 2023

(65) Prior Publication Data

US 2024/0208469 A1 Jun. 27, 2024

(30) Foreign Application Priority Data

Dec. 26, 2022 (JP) ................................ 2022-208400

(51) Int. Cl.
| | |
|---|---|
| *B60W 30/09* | (2012.01) |
| *B60T 7/12* | (2006.01) |
| *B60T 8/1755* | (2006.01) |
| *B60W 10/18* | (2012.01) |
| *B60W 30/04* | (2006.01) |

(52) U.S. Cl.
CPC ............ *B60T 7/12* (2013.01); *B60T 8/17554* (2013.01); *B60T 8/17558* (2013.01); *B60W 10/18* (2013.01); *B60W 30/09* (2013.01); *B60T 2201/022* (2013.01); *B60W 2030/043* (2013.01)

(58) Field of Classification Search
CPC ...... B60T 7/12; B60T 8/1755; B60T 8/17551; B60T 8/17554; B60T 8/17558; B60T 2201/022; B60W 30/09; B60W 2030/043

USPC .............................................. 701/70, 72, 80
See application file for complete search history.

(56) References Cited

U.S. PATENT DOCUMENTS

| | | | |
|---|---|---|---|
| 2022/0105809 A1 | 4/2022 | Yamamoto | |
| 2022/0144229 A1* | 5/2022 | Yamamoto | ............ B60T 8/1766 |
| 2022/0289157 A1* | 9/2022 | Leibbrand | ............ B60T 17/221 |
| 2024/0017718 A1* | 1/2024 | Matsuo | ............... B60W 30/045 |
| 2024/0067143 A1* | 2/2024 | Cameron | ............ B60T 8/17552 |
| 2024/0308585 A1* | 9/2024 | Cho | ......................... B60T 7/12 |
| 2024/0343246 A1* | 10/2024 | Goetz | .................. B60W 30/09 |

FOREIGN PATENT DOCUMENTS

| | | |
|---|---|---|
| JP | 2020-117216 A | 8/2020 |
| JP | 2021-146808 A | 9/2021 |

* cited by examiner

*Primary Examiner* — Erick R Solis
(74) *Attorney, Agent, or Firm* — TROUTMAN PEPPER LOCKE LLP

(57) ABSTRACT

A vehicle control system performs a first determination process to determine whether a first condition is satisfied, a second determination process to determine whether a second condition is satisfied, and a precedence process to gradually decrease a braking force of the vehicle by decreasing a braking force applied to a rear wheel preferentially over a braking force applied to a front wheel. The first condition includes at least a braking force condition that the braking force of the vehicle is greater than or equal to a predetermined braking force, and a turning condition that a turning degree of the vehicle is greater than or equal to a predetermined turning degree. The second condition is a condition that the vehicle is brought into a state where braking is to be cancelled while the first condition is being satisfied. The precedence process is performed when the second condition is satisfied.

8 Claims, 9 Drawing Sheets

VEHICLE CONTROL SYSTEM

CROSS-REFERENCE TO RELATED APPLICATION

The present application claims priority from Japanese Patent Application No. 2022-208400 filed on Dec. 26, 2022, the entire contents of which are hereby incorporated by reference.

BACKGROUND

The disclosure relates to a vehicle control system to be applied to a vehicle including a braking unit that brakes the vehicle.

Japanese Unexamined Patent Application Publication (JP-A) No. 2020-117216 discloses a technique that controls a rolling motion of a vehicle by adjusting the distribution ratio of a braking force to a target wheel including at least one of a rear wheel on an inside during turning of the vehicle and a front wheel on an outside during turning of the vehicle when the braking force is applied to the vehicle under a situation where the vehicle is turning.

Further, JP-A No. 2021-146808 discloses a technique that controls a posture of a vehicle by a torque vectoring control unit that adjusts a driving force or braking force of the left and right wheels to control turning driving, and a damping force control unit that corrects and controls damping force of a buffer (suspension) according to the roll of the vehicle body added by adjusting the driving force or the braking force by the torque vectoring control unit.

SUMMARY

An aspect of the disclosure provides a vehicle control system to be applied to a vehicle. The vehicle including a braking unit configured to brake a vehicle. The vehicle control system includes one or more processors and one or more memories in which a program to be executed by the one or more processors is stored. The program includes one or more commands adapted to cause the one or more processors to perform a first determination process to determine whether a first condition is satisfied, perform a second determination process to determine whether the second condition is satisfied, and perform a precedence process to gradually decrease the braking force by decreasing a braking force applied to a rear wheel of the vehicle preferentially over a braking force applied to a front wheel of the vehicle. The first condition includes at least a braking force condition that a braking force of the vehicle is greater than or equal to a predetermined braking force, and a turning condition that a turning degree of the vehicle is greater than or equal to a predetermined turning degree. The second condition is a condition that the vehicle is brought into a state where braking by the braking unit is to be cancelled while the first condition is being satisfied. The precedence process is performed when the second condition is satisfied.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
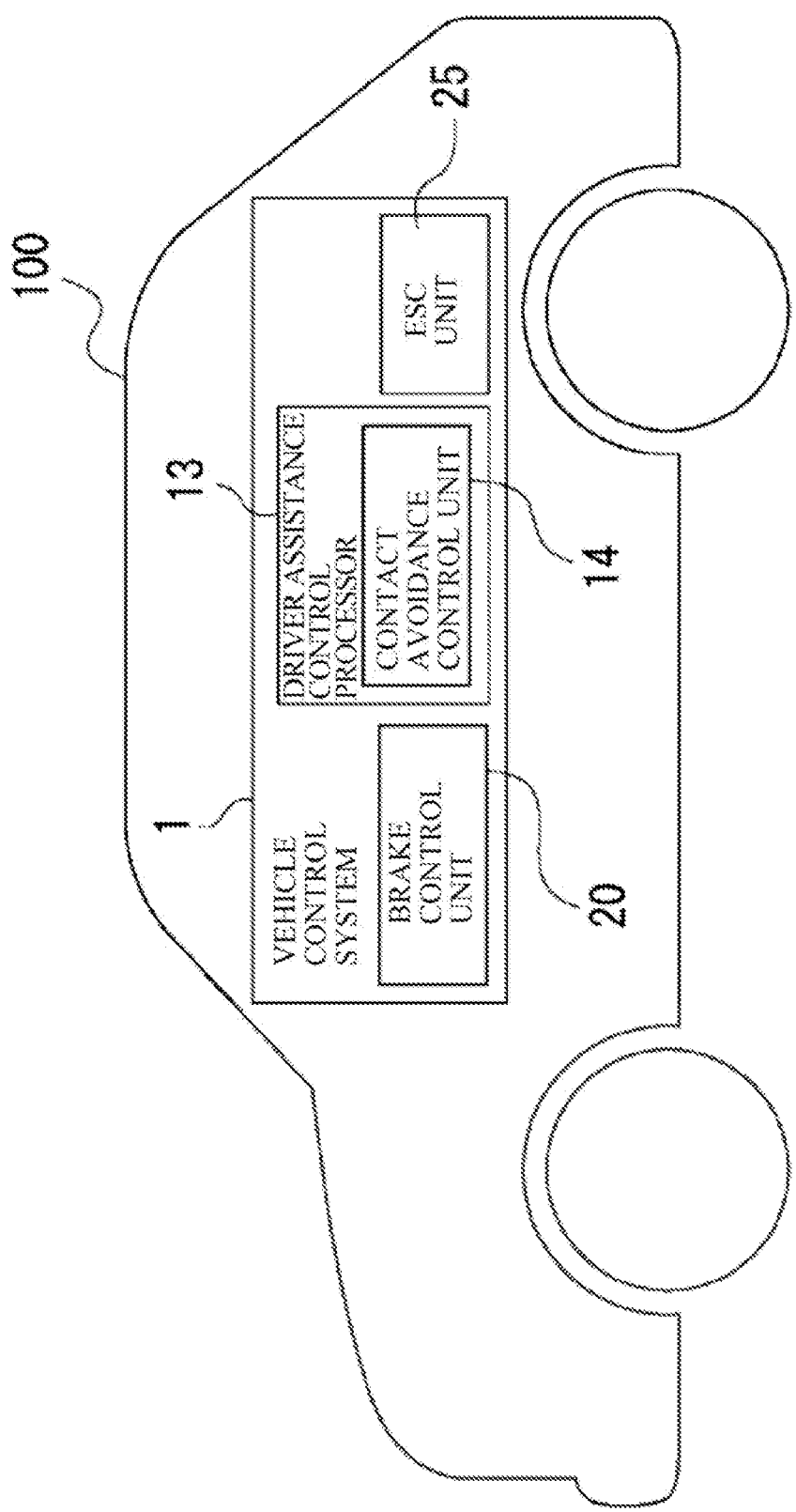
FIG. 1 is a diagram illustrating a schematic configuration of a vehicle including a vehicle control system according to one example embodiment of the disclosure.

It is desirable to provide a vehicle control system that makes it possible to improve vehicle traveling stability.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

Figure 2:
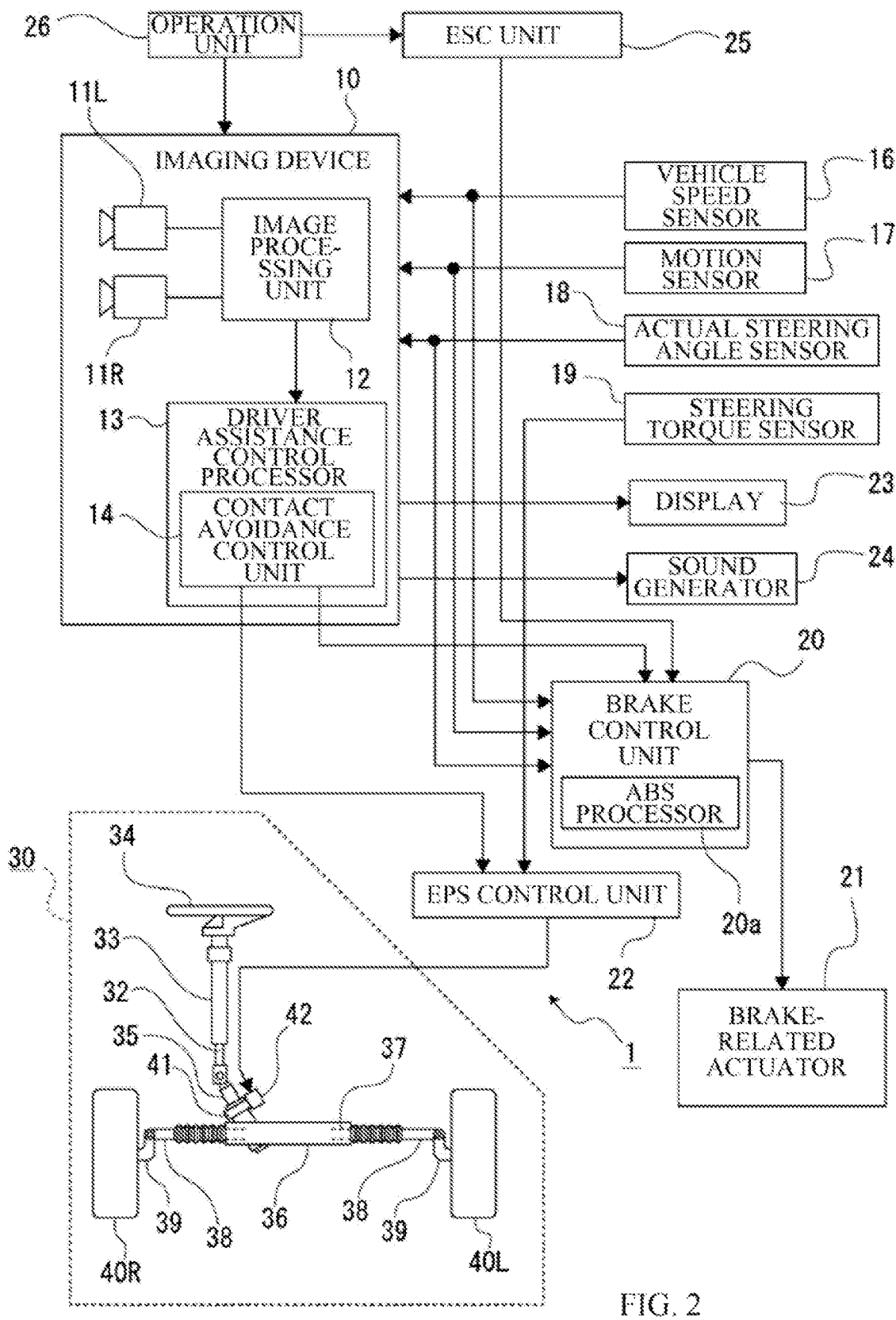
FIG. 2 is an explanatory diagram of an exemplary configuration of the vehicle control system according to one example embodiment of the disclosure.

FIG. 1 illustrates a schematic configuration of a vehicle 100 including a vehicle control system 1 according to an example embodiment of the disclosure. FIG. 2 illustrates an exemplary configuration of the vehicle control system 1 according to the example embodiment. FIG. 2 further illustrates an exemplary configuration of a steering mechanism 30 included in the vehicle 100 as well as the exemplary configuration of the vehicle control system 1.

In the example embodiment, the vehicle 100 may be a four-wheeled vehicle, for example. The vehicle 100 may include one or both of an engine and a traveling motor as a drive source or drive sources of the wheels. That is, the vehicle 100 may be an electric vehicle (EV) including only a traveling motor as a drive source of the wheels, a hybrid electric vehicle (HEV) including both of an engine and a traveling motor as drive sources of the wheels, or an engine vehicle including only an engine as a drive source of the wheels.

The vehicle 100 may include a non-illustrated braking unit that brakes the vehicle 100, and a steering unit (the steering mechanism 30 to be described later) that causes the vehicle 100 to turn in a desired direction.

The term "braking unit" used herein may refer to not only a brake mechanism such as a disk brake or a drum brake and also a configuration that performs brake control of the vehicle 100 using regenerative braking of the traveling motor in a case where the vehicle 100 is an EV or a HEV, in a broad sense.

The term "steering unit" used herein may refer to a configuration (e.g., the steering mechanism 30) that causes the vehicle 100 to turn in any desired direction of right and left directions, in a broad sense.

The vehicle 100 may include a device that recognizes an external environment of the vehicle 100. In the example embodiment, the vehicle 100 may include an imaging device 10 that recognizes the external environment of the vehicle 100, for example. The imaging device 10 will be described later.

As illustrated in FIG. 1, the vehicle control system 1 of the vehicle 100 includes a brake control unit 20 that performs control according to the example embodiment of the disclosure.

The vehicle control system 1 may further include a driver assistance control processor 13 that performs various kinds of driver assistance control. The driver assistance control processor 13 may include a contact avoidance control unit 14. As to be described later, the contact avoidance control unit 14 may conduct contact avoidance brake control on the vehicle 100. The term "contact avoidance brake control" used herein may refer to control to avid contact of the vehicle 100 using the braking unit such as the brake mechanism. The contact avoidance brake control may encompass various kinds of brake control that involve a braking operation to avoid contact of the vehicle 100, such as autonomous emergency braking (AEB), and various kinds of brake control that involve a steering operation to avoid contact of the vehicle 100, such as automatic emergency steering (AES).

The vehicle control system 1 may further include an electronic stability control (ESC) unit 25. The term "ESC" used herein may refer to control in which the braking unit and an engine output (including a motor output in a case of the vehicle 100 including a traveling motor) are controlled to maintain the vehicle 100 in a stable attitude without causing a skid of the vehicle 100.

As illustrated in FIG. 2, the vehicle control system 1 may include a vehicle speed sensor 16, a motion sensor 17, an actual steering angle sensor 18, and a steering torque sensor 19 as sensors relating to the contact avoidance control.

The vehicle control system 1 may further include a display 23 and a sound generator 24 as devices relating to the contact avoidance control.

The vehicle speed sensor 16 may detect an own vehicle speed v which is a speed of the vehicle 100.

The motion sensor 17 may collectively refer to sensors, including a yaw rate (angular velocity) sensor and an acceleration sensor, that detect motions of the vehicle 100.

The actual steering angle sensor 18 may detect actual cutting angles of steered wheels 40 (e.g., a right steered wheel 40R and a left steered wheel 40L to be described later) with respect to a longitudinal axis of the vehicle 100 as actual steering angles.

The steering torque sensor 19 may detect input torque to a steering shaft 32 to thereby detect a steering force (steering input torque) inputted by a driver who drives the vehicle 100 via a steering wheel 34, for example.

The imaging device 10 may include imaging units 11R and 11L, an image processing unit 12, and the driver assistance control processor 13. The imaging units 11R and 11L may be disposed so as to capture an image of an environment in front of the vehicle 100 in a traveling direction.

To the imaging device 10, the vehicle speed sensor 16, the motion sensor 17, and the actual steering angle sensor 18 may be coupled. The image processing unit 12 and the driver assistance control processor 13 that are included in the imaging device 10 may be configured to receive detection signals from these sensors.

To the imaging device 10, an operation unit 26 may be coupled. The operation unit 26 may receive an operational input from the driver who drives the vehicle 100, for example. This enables the image processing unit 12 and the driver assistance control processor 13 to execute a process in accordance with data on the operational input inputted by the driver with the operation unit 26, for example.

The imaging units 11R and 11L may be disposed in the vicinity of an upper portion of a windshield of the vehicle 100 at a predetermined interval in a vehicle width direction such that stereoscopic ranging is enabled, for example. The imaging units 11R and 11L may have respective optical axes parallel to each other, and respective focal lengths equal to each other. The imaging units 11R and 11L may further have respective frame periods synchronized with each other, and respective frame rates equal to each other.

Electric signals (captured image signals) acquired by imaging elements of the imaging units 11R and 11L may be each converted by an analog-to-digital (A/D) conversion into a digital image signal (captured image data) indicating a luminance value based on a predetermined grayscale and on a pixel unit basis. The captured image data may be color image data, for example.

The image processing unit 12 may include a microcomputer that includes a central processing unit (CPU), a read only memory (ROM), and a random access memory (RAM) serving as a work area, for example. The CPU may execute various processes according to programs stored in the ROM.

The image processing unit 12 may store each frame of the captured image data on the environment in front of the vehicle 100 acquired by the imaging units 11R and 11L in an internal memory. Thereafter, based on two frames of the captured image data, the image processing unit 12 may execute various processes to recognize the external environment of the vehicle 100. For example, the image processing unit 12 may perform a process adapted to recognize objects present in front of the vehicle 100, such as regulation lines (e.g., white lines or orange lines) on a road, preceding vehicles, pedestrians, obstacles, and various three-dimensional objects such as guardrails, curbs, or sidewalls that extend along a road.

The term "regulation lines" used herein may refer to lines that divide a traveling lane of the vehicle 100. Based on data on the recognized regulation lines, the image processing unit 12 may recognize the traveling lane of the vehicle 100 (hereinafter also referred to as an own vehicle traveling lane).

To recognize a three-dimensional object present in front of the vehicle 100, the image processing unit 12 may perform a process adapted to acquire distance data from a positional shift of an identical position (i.e., parallax)

between a pair of the captured image data (i.e., a stereo image) acquired by the imaging units 11R and 11L based on a triangular ranging method. Based on the distance data, the image processing unit 12 may generate data indicating three-dimensional distance distribution (hereinafter referred to as distance image). Based on the distance image, the image processing unit 12 may perform a known grouping process to recognize regulation lines and three-dimensional objects such as guardrails, curbs, sidewalls, pedestrians, or vehicles, as described above.

The image processing unit 12 may store the position of the recognized three-dimensional object as three-dimensional object position data. The three-dimensional object position data may indicate the position of the recognized three-dimensional object as position coordinates on an x-z coordinate system having a z-axis in the longitudinal direction of the vehicle 100 and an x-axis in the lateral direction (vehicle width direction) of the vehicle 100. For example, the image processing unit 12 according to the example embodiment may store data on positions of right and left end points of a rear face of a three-dimensional object such as a preceding vehicle, a pedestrian, or an obstacle. The image processing unit 12 may further store a central position between the right and left end points of the rear face as data on a central position of the three-dimensional object.

Further, the image processing unit 12 may calculate and store data on a longitudinal distance dz, a longitudinal relative speed vrz, a longitudinal speed vz, and a longitudinal acceleration rate az of the recognized three-dimensional object. The longitudinal distance dz may be a distance to the three-dimensional object in the z-axis direction. The longitudinal relative speed vrz may be an amount of change in the longitudinal distance dz per unit time. The longitudinal speed vz may be calculated by adding the own vehicle speed v to the longitudinal relative speed vrz. The longitudinal acceleration rate az may be a differential value of the longitudinal speed vz.

Further, the image processing unit 12 may calculate and store data on a lateral distance dx, a lateral relative speed vrx, a lateral speed vx, and a lateral acceleration rate ax of the recognized three-dimensional object. The lateral distance dx may be a distance to the three-dimensional object in the x-axis direction. The lateral relative speed vrx may be an amount of change in the lateral distance dz per unit time. The lateral speed vx may be calculated by adding a lateral moving speed of the vehicle 100 to the lateral relative speed vrx. The lateral acceleration rate ax may be a differential value of the lateral speed vx.

Among the three-dimensional objects recognized as vehicles, the image processing unit 12 may recognize a vehicle traveling closest to the vehicle 100 on the own vehicle traveling lane in substantially the same direction as the vehicle 100 as a preceding vehicle. If a traveling speed of the preceding vehicle is about zero kilometers per hour, the image processing unit 12 may recognize the preceding vehicle as being stopped.

The information on the results of the image recognition, including the data on the position, speed, and acceleration rate of the three-dimensional object and the data on the own vehicle traveling lane, that are acquired by the image processing unit 12 as described above may be used in various kinds of driver assistance control.

Based on the information on the results of the image recognition by the image processing unit 12, the driver assistance control processor 13 may perform various kinds of driver assistance control.

The driver assistance control processor 13 may include the contact avoidance control unit 14. The contact avoidance control unit 14 may include a microcomputer that includes a CPU, a ROM, and a RAM, for example. The contact avoidance control unit 14 may execute various kinds of processes according to programs stored in the ROM.

In one example, the contact avoidance control unit 14 may perform processes relating to autonomous emergency braking (AEB) and automatic emergency steering (AES).

In the contact avoidance control as the AEB or the AES, the contact avoidance control unit 14 may calculate a risk evaluation value representing the degree of a risk of contact with an object based on the results of recognition of the external environment of the vehicle 100 and determine a timing of braking intervention or a timing of steering intervention based on the degree of the risk of contact represented by the risk evaluation value.

For example, the contact avoidance control unit 14 according to the example embodiment may calculate, as the risk evaluation value, time-to-contact (TTC) based on the longitudinal distance dz and the longitudinal relative speed vrz described above for each three-dimensional object recognized by the image processing unit 12. The TTC may be an index indicating how many seconds remain for contact if the current longitudinal relative speed vrz is maintained. For example, the TTC may be calculated by the following expression:

$$TTC = dz/vrz.$$

As the value of the TTC serving as the risk evaluation value decreases, the degree of the risk of contact may increase.

Based on the value of the TTC described above, the contact avoidance control unit 14 may determine whether there is a possible contact object in specific three-dimensional objects of interest among the three-dimensional objects recognized by the image processing unit 12. The term "possible contact object" used herein may refer to an object estimated to come into contact with the vehicle 100.

The term "specific three-dimensional objects of interest" used herein may refer to three-dimensional objects including movable creatures such as people and animals (hereinafter collectively referred to as movable objects). In this example, the term "specific three-dimensional objects of interest" may refer to three-dimensional objects including movable objects except the three-dimensional object recognized as the preceding vehicle. Accordingly, the three-dimensional objects subjected to the contact avoidance control may therefore include guardrails, curbs, and sidewalls as described above.

In one example, the determination regarding the presence of the possible contact object may be performed based on the TTC according to the following procedure.

For example, the contact avoidance control unit 14 may determine whether the specific three-dimensional objects of interest include a three-dimensional object whose rate of overlapping with the vehicle 100 in the lateral direction is greater than or equal to a predetermined value and whose TTC is less than or equal to a predetermined threshold. If no appropriate three-dimensional object is present, the contact avoidance control unit 14 may determine that there is no possible contact object.

If only one appropriate three-dimensional object is found in the determination described above, the contact avoidance control unit 14 may determine the three-dimensional object to be the possible contact object. If multiple appropriate three-dimensional objects are found, the contact avoidance control unit 14 may determine a three-dimensional object having the smallest TTC value among the multiple three-dimensional objects to be the possible contact object, for example.

When the possible contact object is present, the contact avoidance control unit 14 may perform the AEB and, if needed, the AES with respect to the possible contact object. For example, the contact avoidance control unit 14 may start only the AEB first, and may perform, when it is determined that contact is unavoidable only by the AEB, the steering intervention by conducting the AES to avoid the contact while maintaining the braking by the AEB.

Upon the start of the AEB, the contact avoidance control unit 14 may send a brake command to the brake control unit 20 to brake the vehicle 100.

Upon the start of the AES, the contact avoidance control unit 14 may determine a target steering angle based on the results of the image recognition by the image processing unit 12. Thereafter, the contact avoidance control unit 14 may output a steering command current value determined based on the target steering angle to an electric power steering (EPS) control unit 22 to be described later.

The driver assistance control processor 13 may further make various notifications relating the driver assistance to the driver who drives the vehicle 100. For example, the driver assistance control processor 13 may supply display information and sound generation command information to the display 23 and the sound generator 24.

The display 23 may collectively refer to a display control unit including a microprocessor, and a display device, for example. Examples of the display device may include various meters such as a speedometer or a tachometer provided in a meter panel disposed in front of the driver, a multi-function display (MFD), and other devices that present information to the driver. In the contact avoidance control, the display 23 may display a warning about danger of contact with an object or a visual indication that notifies the driver of a start or a stop of the AEB or AES.

Further, the display 23 may display one or both of a notification that the electronic stability control by the ESC unit 25 has been enabled and a notification that the electronic stability control by the ESC unit 25 has been disabled.

The term "enabling" control used herein may refer to making the control executable (allowable to execute). The term "disabling" control used herein may refer to making the control inexecutable (unallowable to execute).

The sound generator 24 may collectively refer to a sound control unit including a microcomputer, and a sound generation device such as an amplifier or a speaker, for example. In the contact avoidance control, the sound generator 24 may output a warning sound that notifies the driver of a start or a stop of the AEB or AES, for example.

The vehicle control system 1 may include a brake control unit 20 and a brake-related actuator 21 to achieve brake control of the vehicle 100.

The brake control unit 20 may include a microcomputer that includes a CPU, a ROM and a RAM, for example. The brake control unit 20 may control various actuators provided as the brake-related actuator 21. Examples of the brake-related actuator 21 may include various kinds of brake-related actuators including a hydraulic control actuator that controls the hydraulic pressure of an output from a brake booster to a master cylinder and a hydraulic pressure inside a brake liquid pipe.

In the example embodiment, the vehicle speed sensor 16, the motion sensor 17, and the actual steering angle sensor 18 may be coupled to the brake control unit 20. The brake control unit 20 may receive detection signals from these sensors.

The brake control unit 20 may include an anti-lock brake system (ABS) processor 20a. During braking the vehicle 100, the ABS processor 20a may control the above-described hydraulic control actuator based on slip ratios of the steered wheels 40R and 40L so that the steered wheels 40R and 40L are prevented from idling.

The slip ratio to be used in the ABS control may be calculated by a known method, and the method of calculating the slip ratio is not limited to a particular calculation method. The slip ratio may be calculated based on a wheel speed detected by a wheel speed sensor and a vehicle speed, for example.

The brake control unit 20 may perform brake control of the vehicle 100 by controlling the above-described hydraulic control actuator based on a command from the driver assistance control processor 13 (including the contact avoidance control unit 14). The brake control as the AEB described above may be thereby achieved.

Further, the brake control unit 20 may perform a braking force decreasing process based on various determination processes according to the example embodiment and results of the determination processes. Details of the process according to the example embodiment will be described later.

The ESC unit 25 may be a control unit that achieves the electronic stability control. For example, the ESC unit 25 may include a microcomputer that includes a CPU, a ROM, and a RAM, and may achieve the electronic stability control by executing various kinds of processes according to programs stored in the ROM.

In this example, the ESC unit 25 may include various sensors, such as a wheel speed sensor and a yaw rate sensor, to be used in the electronic stability control. The CPU of the ESC unit 25 may achieve the electronic stability control by controlling the brake control unit 20 described above based on detection data acquired by these sensors.

To the ESC unit 25, the operation unit 26 may be coupled. In this example, an operation to enable the electronic stability control by the ESC unit 25 and an operation to disable the electronic stability control by the ESC unit 25 may be conducted on the vehicle 100 using the operation unit 26.

The ESC unit 25 may enable or disable the electronic stability control based on the operation of the operation unit 26.

The EPS control unit 22 may include a microcomputer, for example. The EPS control unit 22 may control an EPS motor 42 in the steering mechanism 30 based on the steering command current value sent from the contact avoidance control unit 14 in the driver assistance control processor 13 and the detection signal sent from the steering torque sensor 19.

Based on the data on the steering input torque inputted by the driver and acquired from the detection signal sent from the steering torque sensor 19, the EPS control unit 22 may determine a steering command current value to acquire steering assistance torque corresponding to the steering input torque. Based on the steering command current value, the EPS control unit 22 may drive the EPS motor 42. This achieves power steering control that assists the driver in performing a steering operation.

Note that the driver may be allowed to perform a steering operation during the execution of the steering control by the contact avoidance control unit 14. When a manual steering operation is performed during the steering control, the EPS control unit 22 may calculate the sum of the steering command current value sent from the contact avoidance control unit 14 and the steering command current value for the power steering control calculated as described above. Based on the sum of the current values, the EPS control unit 22 may drive the EPS motor 42.

The steering mechanism 30 to be subjected to the steering control may be configured as follows.

The steering mechanism 30 may have the steering shaft 32 rotatably supported by a non-illustrated vehicle body frame via a steering column 33. One end of the steering shaft 32 may extend toward a driver seat, and the steering wheel 34 may be attached to the end of the steering shaft 32. A pinion shaft 35 may be joined to the other end of the steering shaft 32.

The pinion shaft 35 may have a non-illustrated pinion engaged with a rack of a rack shaft 37 extending in a steering gear box 36 and supported by the steering gear box 36 in a reciprocally movable manner. A rack-and-pinion steering gear mechanism may be thereby configured.

Right and left ends of the rack shaft 37 may each project from the steering gear box 36. Respective tie rods 38 may be joined to the right and left ends of the rack shaft 37. A front knuckle 39 may be coupled to one end of each of the tie rods 38 opposite to the other end joined to the rack shaft 37. The front knuckles 39 may support the respective steered wheels 40 (the right steered wheel 40R and the left steered wheel 40L) and may be supported by the vehicle body frame via non-illustrated kingpins. The front knuckles 39 may be each coupled to an end of a corresponding one of the tie rods 38 so as to be rotatable about the kingpin.

Accordingly, when the steering shaft 32 and the pinion shaft 35 are rotated by operating the steering wheel 34, the rotation of the pinion shaft 35 may move the rack shaft 37 in a lateral direction. The lateral movement of the rack shaft 37 may rotate the front knuckle 39 about the kingpin, which steers the steered wheel 40R or 40L in the lateral direction.

The EPS motor 42 may be attached to the pinion shaft 35 via an assisting transmission mechanism 41. The EPS motor 42 may assist steering torque applied to the steering wheel 34 or may apply such steering torque that achieves a target steering angle.

According to the vehicle control system 1 of the example embodiment described above, the AEB control may be performed when the possible contact object is detected, and the steering intervention may be performed by the AES when it is determined that the contact is unavoidable only by the AEB that brakes the vehicle 100.

An exemplary procedure for the contact avoidance control described above will now be described with reference to the flowchart illustrated in FIG. 3, for confirmation.

Figure 3:
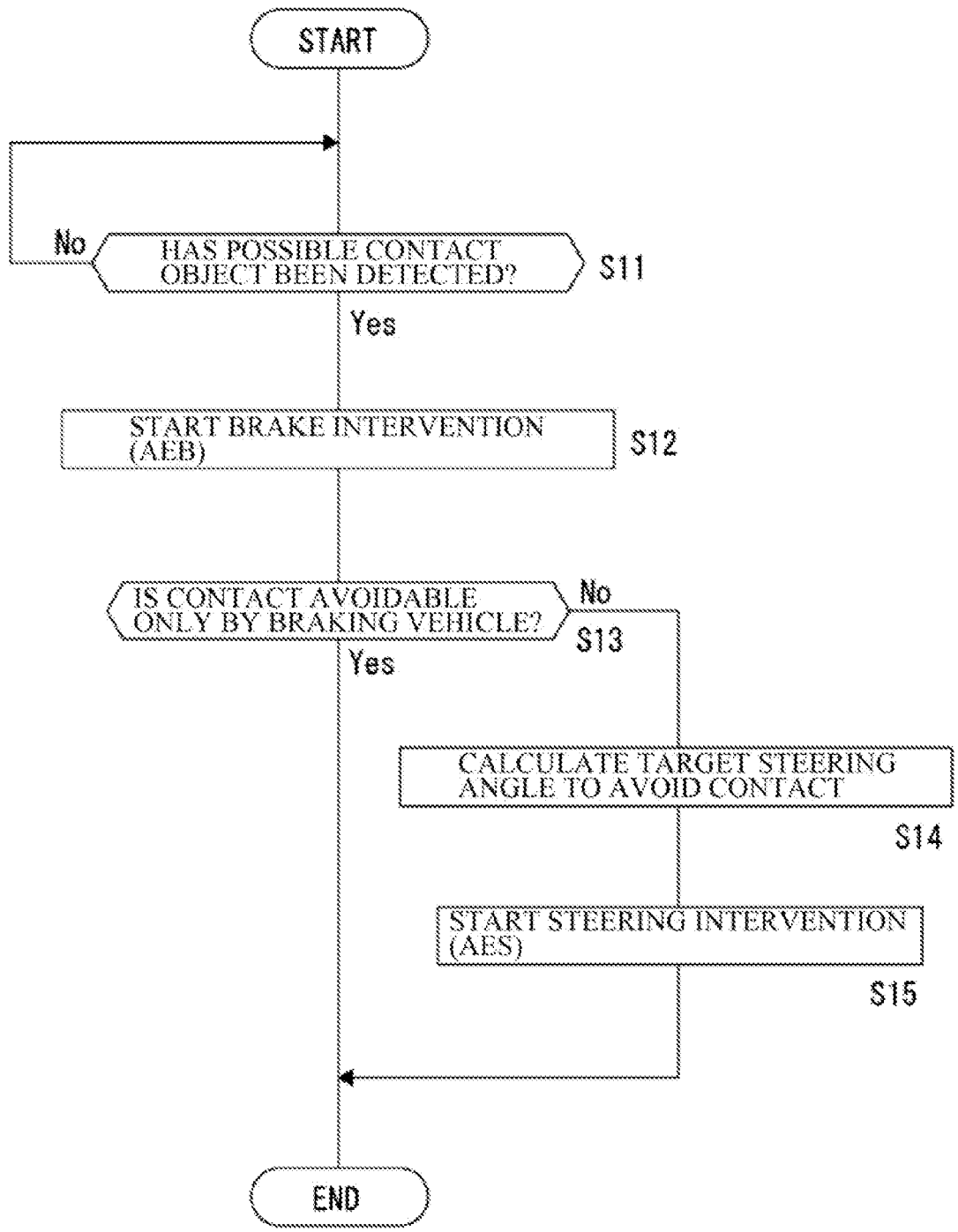
FIG. 3 is a flowchart of an exemplary procedure of contact avoidance control according to one example embodiment of the disclosure.

As illustrated in FIG. 3, the contact avoidance control unit 14 may first determine whether the possible contact object has been detected (Step S11). For example, using the method described above, the contact avoidance control unit 14 may determine whether there is a three-dimensional object satisfying the above-described conditions regarding the lap rate and the TTC in the three-dimensional objects recognized by the image processing unit 12. If it is determined that there is the three-dimensional object satisfying the conditions, the contact avoidance control unit 14 may determine that the possible contact object has been detected (Step S11: Yes). As described above, if there are multiple three-dimensional objects satisfying the conditions, the contact avoidance control unit 14 may select one of the three-dimensional objects as the possible contact object based on the values of the TTC.

Thereafter, in Step S12, the contact avoidance control unit 14 may start brake intervention. That is, the contact avoidance control unit 14 may start the AEB control. For example, the contact avoidance control unit 14 may send the brake control unit 20 a command to thereby start braking the vehicle 100 by the AEB.

Thereafter, in Step S13, the contact avoidance control unit 14 may determine whether the contact is avoidable only by braking the vehicle 100. The determination may be made by a known method, for example. In one example, the determination may be made based on the current longitudinal relative speed vrz of the possible contact object and map data indicating the TTC values adapted to avoid the contact and set for respective values of the longitudinal relative speed vrz.

If it is determined that the contact is avoidable only by braking the vehicle 100 (Step S13: Yes), the contact avoidance control unit 14 may end a series of processes illustrated in FIG. 3. That is, in that case, the contact may be avoided only by the AEB.

In contrast, it is determined that the contact is unavoidable only by braking the vehicle 100 (Step S13: No), the procedure may proceed to Step S14. In Step S14, the contact avoidance control unit 14 may calculate a target steering angle adapted to avoid the contact. That is, the contact avoidance control unit 14 may calculate a target steering angle adapted to avoid contact with the object recognized as the possible contact object.

After calculating the target steering angle in Step S14, the contact avoidance control unit 14 may start steering intervention in Step S15. That is, the contact avoidance control unit 14 may start the AES control. For example, the contact avoidance control unit 14 may send the target steering angle adapted to avoid the contact to the EPS control unit 22 to thereby start the steering intervention to avoid the contact.

After performing the steering intervention in Step S15, the contact avoidance control unit 14 may end the series of processes illustrated in FIG. 3.

In the following, an example is described in which a sudden braking state is eliminated while the vehicle 100 is traveling in a state where the braking force of the vehicle 100 is greater than or equal to a predetermined braking force (i.e., where the vehicle 100 is in the sudden braking state) and where the turning degree of the vehicle 100 is greater than or equal to a predetermined turning degree.

As used herein, the term "turning degree" may refer to the degree of turning of the vehicle 100, that is, the degree of load biased to an outer wheel during turning of the vehicle 100.

In this example, while the sudden braking state is being eliminated and the braking force is being gradually decreased, a load may be applied to the front wheels, and grip of the front wheels may be gradually recovered. Thus, if the vehicle 100 keeps turning, the vehicle 100 is likely to cause oversteering, resulting in a spinning behavior of the vehicle 100. In particular, spinning is likely to occur while the vehicle 100 is traveling on a road having a low frictional coefficient μ (hereinafter referred to as a low friction road), such as a snow road or an ice road.

According to the example embodiment, the vehicle 100 is configured to perform the electronic stability control (ESC), and the ESC may be activated in the situation described above. This prevents the vehicle 100 from exhibiting the spinning behavior.

However, when the ESC is disabled or when a vehicle is not configured to perform the ESC, the spinning behavior of the vehicle 100 is to be prevented by an operation of the driver who drives the vehicle 100. If the driver is an unskilled driver, it may be difficult for the driver to avoid the spinning behavior of the vehicle 100.

In view of such circumstances, the vehicle control system 1 according to the example embodiment is provided for the following purpose.

That is, the vehicle control system 1 according to the example embodiment prevents the vehicle 100 from exhibiting the spinning behavior when the sudden braking state is eliminated while the vehicle 100 is traveling in a state where the braking force of the vehicle 100 is greater than or equal to the predetermined braking force and where the turning degree of the vehicle 100 is greater than or equal to the predetermined turning degree. This makes it possible to improve the traveling stability of the vehicle 100.

Figure 4:
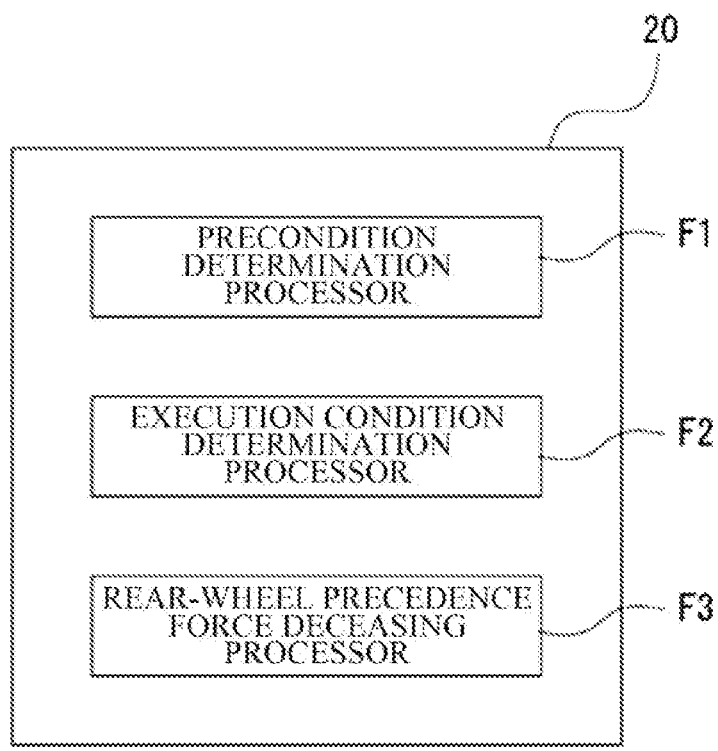
FIG. 4 is a block diagram for describing an exemplary operation of the vehicle control system according to one example embodiment of the disclosure.

For the purpose, the brake control unit 20 of the vehicle control system 1 may include some operational units as illustrated in FIG. 4.

FIG. 4 is a block diagram for describing exemplary operations of the brake control unit 20 according to the example embodiment.

The brake control unit 20 may include a precondition determination processor F1, an execution condition determination processor F2, and a rear-wheel precedence force decreasing processor F3 as well as the ABS processor 20a described above.

The precondition determination processor F1 performs a precondition determination process to determine whether a processing precondition is satisfied. The processing precondition includes at least a braking force condition that the braking force of the vehicle 100 is greater than or equal to the predetermined braking force and a turning condition that the turning degree of the vehicle 100 is greater than or equal to the predetermined turning degree. In one embodiment, the precondition determination process may serve as a "first determination process". In one embodiment, the processing precondition may serve as a "first condition".

The execution condition determination processor F2 performs an execution condition determination process to determine whether a processing execution condition is satisfied. The processing execution condition is a condition that the vehicle 100 is brought into a state where braking is to be cancelled while the processing precondition is being satisfied. In one embodiment, the execution condition determination process may serve as a "second determination process". In one embodiment, the processing execution condition may serve as a "second condition".

When the processing execution condition is satisfied, the rear-wheel precedence force decreasing processor F3 performs a rear-wheel precedence force decreasing process as the braking force decreasing process to gradually decrease the braking force. In the rear-wheel precedence force decreasing process, the braking force applied to the rear wheels of the vehicle 100 is decreased preferentially over the braking force applied to the front wheels of the vehicle 100.

In other words, in the rear-wheel precedence force decreasing process, the braking force applied to the front wheels is remained to be greater than the braking force applied to the rear wheels.

In one embodiment, the rear-wheel precedence force decreasing process may serve as a "precedence process".

If the braking force applied to each wheel is uniformly decreased when the vehicle 100 is brought from the state where the braking force of the vehicle 100 is greater than or equal to the predetermined braking force and the turning degree of the vehicle 100 is greater than or equal to the predetermined turning degree (i.e., the state where the processing precondition is satisfied) into the state where braking of the vehicle 100 is to be cancelled (i.e., when the processing execution condition is satisfied), a load is biased to the front wheels, and grip of the front wheels is recovered. This can cause oversteering of the vehicle 100, resulting in the spinning behavior of the vehicle 100.

To address such a concern, according to the example embodiment, the rear-wheel precedence force decreasing process is performed as the process adapted to gradually decrease the braking force when the processing execution condition is satisfied. In the rear-wheel precedence force decreasing process, the braking force applied to the rear wheels is decreased preferentially over the braking force applied to the front wheels.

Accordingly, when the vehicle 100 is brought from the state where the braking force of the vehicle 100 is greater than or equal to the predetermined braking force (i.e., where sudden braking is applied to the vehicle 100) and where the turning degree of the vehicle 100 is greater than or equal to the predetermined turning degree into the state where braking of the vehicle 100 is to be cancelled, the sudden braking is cancelled so that the vehicle 100 is prevented from occurring oversteering. This makes it possible to prevent the vehicle 100 from exhibiting the spinning behavior.

The change from the state where the vehicle 100 is traveling in the state where the braking force is greater than or equal to the predetermined braking force and the turning degree of the vehicle 100 is greater than or equal to the predetermined turning degree to the state where braking of the vehicle 100 is to be cancelled is caused when the contact avoidance brake control is started once and thereafter terminated, for example.

In that case, since the sudden braking is not cancelled according to a driver's intention, it is difficult to prevent the vehicle 100 from exhibiting the spinning behavior by a driver's operation.

If the ESC is being enabled, the spinning behavior of the vehicle 100 can be avoided by the ESC. However, if the ESC is being disabled, it is difficult to avoid the spinning behavior of the vehicle 100.

To address such a concern, according to the example embodiment of the disclosure, the processing precondition for the rear-wheel precedence force decreasing process may further include a condition that the contact avoidance brake control is being activated and a condition that ESC is being disabled in addition to the braking force condition and the turning condition that are described above. In that case, the processing execution condition may be a condition that the vehicle 100 is brought into a state where the contact avoidance brake control is to be terminated while the processing precondition is being satisfied.

In this example, whether the braking force condition is satisfied may be estimated by determining whether the ABS is being activated.

In this example, the precondition determination processor F1 and the execution condition determination processor F2 may perform the following determination processes to determine whether the above-described conditions are satisfied.

For example, the precondition determination processor F1 may determine whether the braking force condition is satisfied by determining whether the ABS control is being activated. Further, the precondition determination processor F1 may determine whether the processing precondition is satisfied by determining whether at least four conditions are satisfied. The at least four conditions may include the condition that the contact avoidance brake control is being activated, the braking force condition, the turning condition, and the condition that the ESC is being disabled.

The execution condition determination processor F2 may determine whether the processing execution condition is satisfied by determining whether the vehicle 100 is in the state where the contact avoidance brake control is to be terminated.

In this example, the processing precondition may further include a condition that the vehicle 100 is traveling on a low friction road.

In that case, the precondition determination processor F1 may determine whether the processing precondition is satisfied by determining whether the contact avoidance brake control is being activated, whether the ESC is being disabled, whether the vehicle 100 is traveling on the low friction road, whether the ABS is being activated (whether the braking force condition is satisfied), and whether the turning degree is greater than or equal to the predetermined turning degree (whether the turning condition is satisfied).

Now, an example of the rear-wheel precedence force decreasing process is described with reference to FIGS. 5 and 6.

First, a braking force decreasing process according to a comparative example is described with reference to FIG. 5.

Figure 5:
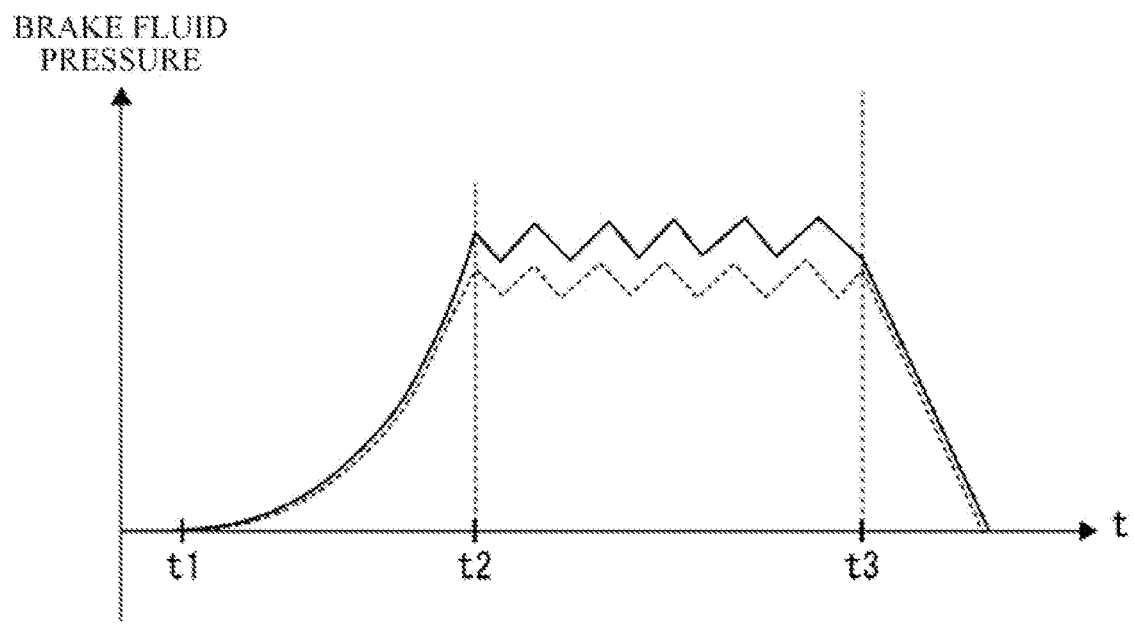
FIG. 5 is a diagram illustrating a braking force decreasing process according to a comparative example.

In FIG. 5, time t1 represents a timing at which the contact avoidance brake control is activated, time t2 represents a timing at which the ABS is activated, and time t3 represents a timing at which the processing execution condition is satisfied, that is, in this example, a timing at which the vehicle 100 is brought into a state where the contact avoidance brake control is to be terminated.

A solid line in FIG. 5 represents a change in brake fluid pressure of the front wheels, and a dotted line represents a change in brake fluid pressure of the rear wheels.

When the processing execution condition is satisfied at the time t3, the brake fluid pressure to the front wheels and the brake fluid pressure to the rear wheels are decreased at the same decreasing rate in the comparative example illustrated in FIG. 5.

Figure 6:
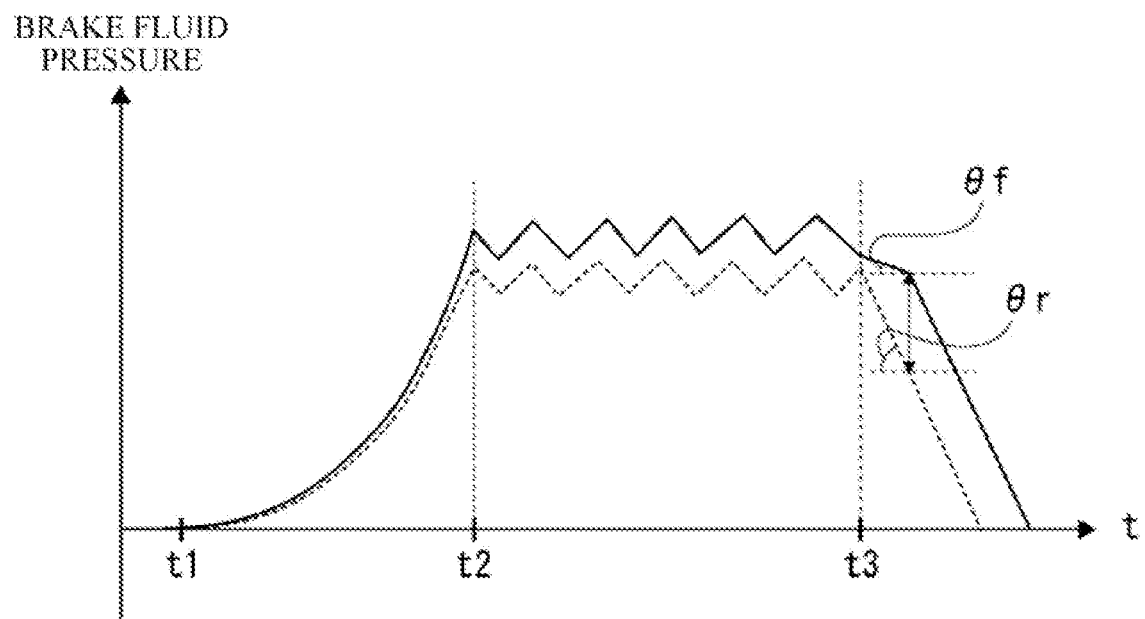
FIG. 6 is a diagram illustrating a braking force decreasing process according to one example embodiment of the disclosure.

In contrast, according to the example embodiment of the disclosure illustrated in FIG. 6, when the processing execution condition is satisfied at the time t3, the process adapted to gradually decrease the braking force is performed so that the brake fluid pressure to the rear wheels is decreased preferentially over the brake fluid pressure to the front wheels. For example, the brake fluid pressure to the front wheels and the brake fluid pressure to the rear wheels may be gradually decreased so that a decreasing rate of the brake fluid pressure to the rear wheels becomes greater than a decreasing rate of the brake fluid pressure to the front wheels.

In the example embodiment of the disclosure, the rear-wheel precedence force decreasing processor F3 may determine a difference in the decrease rate (hereinafter referred to as a decreasing rate difference) between the braking force applied to the front wheels and the braking force applied to the rear wheels in the braking force decreasing process based on one or both of the vehicle speed and the turning degree of the vehicle 100 that are measure in a processing stand-by time from the timing at which the braking force condition is satisfied to the timing at which the rear-wheel precedence force decreasing process is started.

In this example, an inclination θf, which is the inclination of decrease in the brake fluid pressure to the front wheels, and an inclination θr, which is the inclination of decrease in the brake fluid pressure to the rear wheels may be determined as data corresponding to the decreasing rate difference described above.

If the vehicle speed or the turning degree is high at the timing at which the processing execution condition is satisfied (i.e., the timing at which the sudden braking state is eliminated), the vehicle 100 is likely to spin. To address such a concern, the decreasing rate difference between the braking force applied to the front wheels and the braking force applied to the rear wheels in the braking force decreasing process may be determined based on one or both of the vehicle speed and the turning degree in the processing stand-by time as described above. In this example, the vehicle speed and the turning degree in the processing stand-by time may be the vehicle speed and the turning degree at the timing at which the processing execution condition is satisfied, for example.

If it is determined that the vehicle 100 is likely to spin when the sudden braking state is eliminated because the vehicle speed or the turning degree is high, the decreasing rate difference between the braking force applied to the front wheels and the braking force applied to the rear wheels may be increased by increasing the decreasing rate of the braking force to the rear wheels, for example. This helps to further prevent the vehicle 100 from spinning.

In contrast, if it is determined that the vehicle 100 is unlikely to spin when the sudden braking state is eliminated because the vehicle speed or the turning degree is low, the decreasing rate difference between the braking force applied to the front wheels and the braking force applied to the rear wheels may be decreased by decreasing the decreasing rate of the braking force to the rear wheels, for example. This helps to prevent the vehicle 100 from being unnecessarily understeered. It is therefore possible to improve drivability.

Whether the vehicle speed is high may be determined by determining whether the own vehicle speed v is greater than or equal to a predetermined value, for example. Whether the turning degree is high may be determined by determining whether the value of an actual steering angle detected by the actual steering angle sensor 18 is greater than or equal to a predetermined value, for example.

When the decreasing rate difference between the braking force applied to the front wheels and the braking force applied to the rear wheels is determined based on both of the vehicle speed and the turning degree, map data may be used in which each combination of a vehicle speed and a turning degree is associated with the data on a corresponding decreasing rate difference. In that case, the map data may have a map characteristic that the decreasing rate difference increases as the vehicle speed and the turning degree increase.

The vehicle speed and the turning degree in the processing stand-by time may be those detected at any timing in the processing stand-by time, or may be each an average value of those detected in the processing stand-by time.

In either case, the vehicle speed and the turning degree used in the example embodiment may be those based on which likelihood of spinning of the vehicle 100 at the time when the sudden braking state is eliminated may be estimated. In that sense, the vehicle speed and the turning degree may be those measured in the processing stand-by time.

In the example embodiment illustrated in FIG. 6, the inclination of the decreasing rate of the brake fluid pressure to the front wheels may be changed from the initial inclination θf to the same inclination as the inclination θr of the decreasing rate of the brake fluid pressure to the rear wheels during the rear-wheel precedence force decreasing process. However, the inclination of the decreasing rate of the brake fluid pressure to the front wheels may not be necessarily changed to the same inclination as the inclination θr of the decreasing rate of the brake fluid pressure to the rear wheels, and may be changed to any inclination other than the inclination θr. Alternatively, the inclination of the decreasing rate of the brake fluid pressure to the front wheels may not be changed during the rear-wheel precedence force decreasing process.

In either case, the braking force applied to the rear wheels is preferentially over the braking force applied to the front wheel in the rear-wheel precedence force decreasing process according to the example embodiment.

Figure 7:
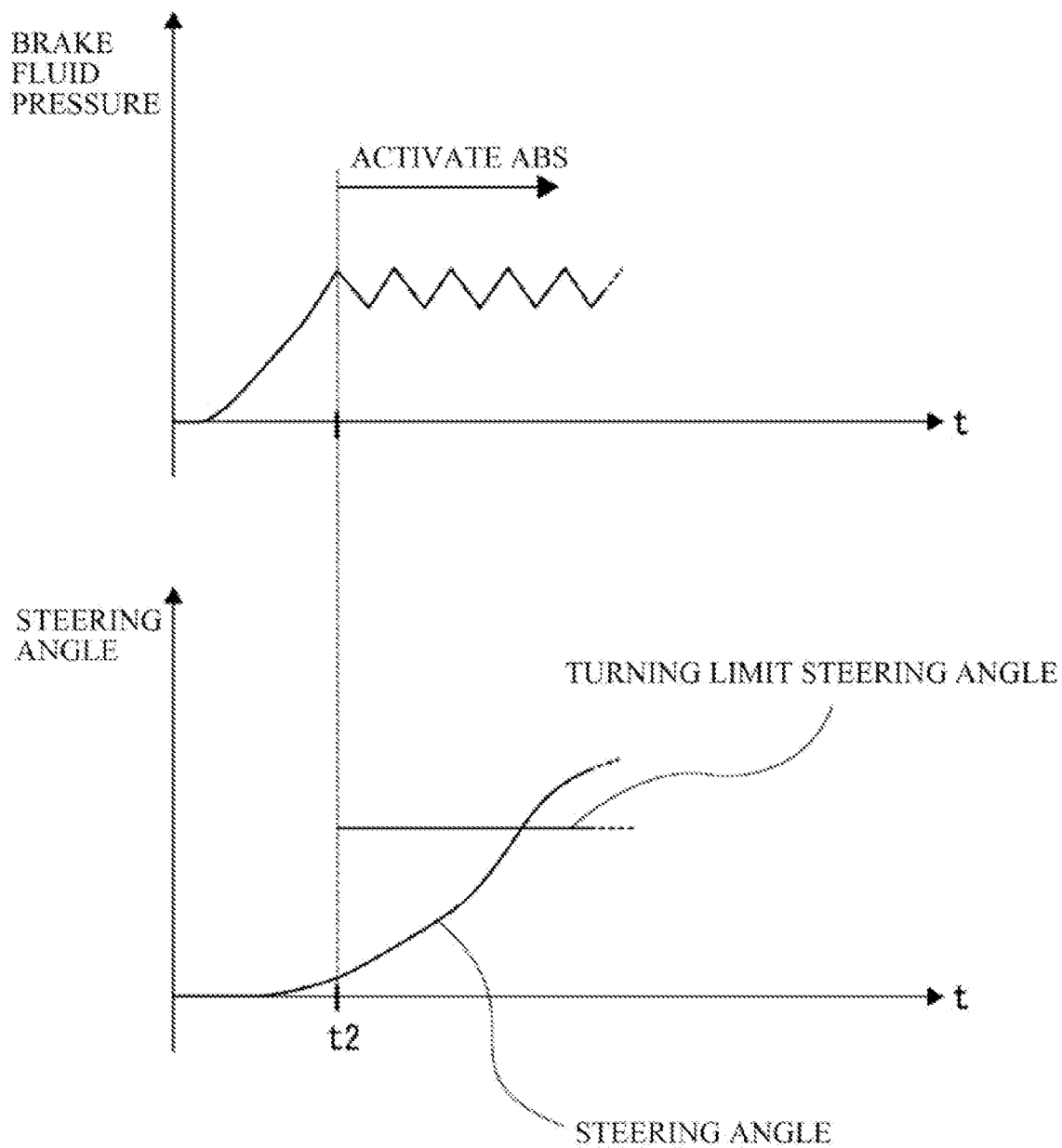
FIG. 7 is a diagram illustrating an exemplary method of determining whether a turning condition is satisfied, according to one example embodiment of the disclosure.

FIG. 7 is a diagram illustrating an exemplary method of determining whether the turning condition is satisfied.

In FIG. 7, the time t2 represents the timing at which the braking force condition is satisfied, that is, in this example, the timing at which the ABS control is activated, as in FIGS. 5 and 6.

In this example, the precondition determination processor F1 may determine whether the turning condition is satisfied based on a turning threshold. The turning threshold may be determined based on a braking force measured while the braking force condition is being satisfied.

For example, after the ABS control is activated at the time t2, the precondition determination processor F1 may sequentially execute a process adapted to calculate an average value of the braking forces detected during the ABS control, and calculate a turning limit steering angle based on the average value. The process may be repeated in a predetermined processing cycle.

The turning limit steering angle may be a steering angle at which the vehicle 100 is estimated to exhibit a spinning behavior when the application of a braking force to the vehicle 100 is stopped. In other words, if the steering angle of the vehicle 100 is greater than or equal to the turning limit steering angle when the application of the braking force to the vehicle 100 is stopped, it may be estimated that the vehicle 100 will exhibit the spinning behavior.

In this example, a correspondence relation between the braking force and the turning limit steering angle may be determined through experiments or simulations in advance, and the turning limit steering angle may be calculated based on the braking force measured during the ABS control referring to the data (e.g., map data or arithmetic function data) on the correspondence relation between the braking force and the turning limit steering angle.

Note that the turning limit steering angle may tend to decrease as the braking force increases.

Using the turning limit steering angle calculated as described above, the precondition determination processor F1 may determine whether the turning condition is satisfied. For example, whether the turning condition is satisfied may be determined by determining whether an actual current steering angle detected by the actual steering angle sensor 18 is greater than or equal to the turning limit steering angle.

As described above, the determination as to whether the turning condition is satisfied may be made based on the turning limit steering angle determined based on the braking force measured while the braking force condition is being satisfied. This makes it possible to accurately determine whether the processing precondition is satisfied (i.e., whether the vehicle 100 exhibits the spinning behavior when the sudden braking state is eliminated) depending on the degree of the braking force.

An exemplary procedure for implementing the traveling stability control according to the example embodiment described above will now be described with reference to a flowchart illustrated in FIG. 8.

Figure 8:
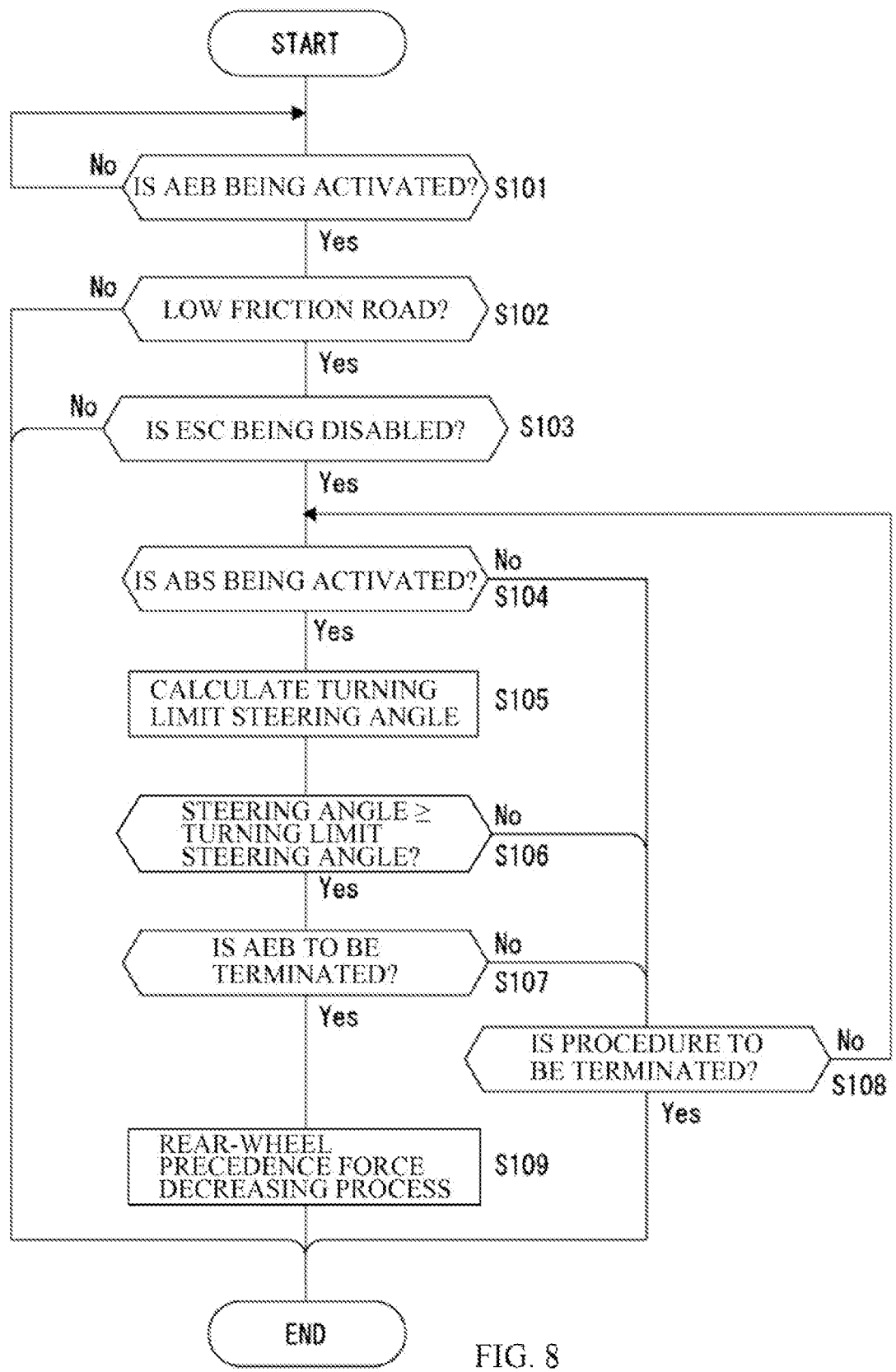
FIG. 8 is a flowchart of an exemplary procedure adapted to achieve traveling stability control according to one example embodiment of the disclosure.

In this example, the procedure illustrated in FIG. 8 may be executed by the CPU of the brake control unit 20 according to a program stored in the memory such as the ROM in the brake control unit 20, for example.

First, in Step S101, the brake control unit 20 may wait for activation of the AEB. That is, the brake control unit 20 may wait until the contact avoidance control unit 14 starts the AEB (refer to Step S12 in FIG. 3).

Thereafter, in Step S102, the brake control unit 20 may determine whether the vehicle 100 is traveling on a low friction road. That is, the brake control unit 20 may determine whether the frictional coefficient μ of the road surface of the traveling road of the vehicle 100 is less than or equal to a predetermined value.

The frictional coefficient μ of the low friction road may be estimated by a known method, and the method of estimating the frictional coefficient μ is not limited to a particular method. For example, the frictional coefficient μ of the low friction road may be estimated in the image processing at the image processing unit 12. Alternatively, the frictional coefficient μ of the low friction road may be estimated based on the slip ratio of the wheels.

In this example, the low friction road may be a wet road due to rainfall, a snow road, an ice road, or a mud road, for example. The term "low friction road" used herein may refer to a road determined to have a frictional coefficient μ less than or equal to the predetermined value. The predetermined value may vary depending on turning performance of the vehicle 100, for example, and is not limited to a particular value.

If it is determined that the frictional coefficient μ of the low friction road is not less than or equal to the predetermined value and that the vehicle is not traveling on the low friction road (Step S102: No), the brake control unit 20 may end a series of processes illustrated in FIG. 8.

That is, because the processing precondition for the rear-wheel precedence force decreasing process according to the example embodiment includes the condition that the vehicle is traveling on the low friction road, the rear-wheel precedence force decreasing process may not be performed when the vehicle 100 is not traveling on the low friction road.

In contrast, if it is determined that the vehicle is traveling on the low friction road (Step S102: Yes), the procedure may proceed to Step S103. In Step S103, the brake control unit 20 may determine whether the ESC is being disabled.

If it is determined that the ESC is not being disabled (Step S103: No), the brake control unit 20 may end the series of processes illustrated in FIG. 8.

That is, because the processing precondition for the rear-wheel precedence force decreasing process according to the example embodiment includes the condition that the ESC is being disabled, the rear-wheel precedence force decreasing process may not be performed when the ESC is not being disabled.

If it is determined that the ESC is being disabled (Step S103: Yes), the procedure may proceed to Step S104. In Step S104, the brake control unit 20 may determine whether the ABS is being activated. That is, the brake control unit 20 may determine whether the ABS processor 20a described above is performing the ABS control. In this example, the determination process at Step S104 may correspond to a process adapted to determine whether the braking force condition is satisfied.

If it is determined that the ABS is being activated (Step S104: Yes), the procedure may proceed to Step S105. In Step S105, the brake control unit 20 may calculate the turning limit steering angle. In this example, the brake control unit 20 may calculate an average value of the braking forces (brake fluid pressures in this example) measured while the ABS control is being activated, and may calculate the turning limit steering angle based on the average value. Since the method of calculating the turning limit steering angle based on the braking forces has been already described above, the description thereof is omitted herein to avoid redundancy.

Thereafter, in Step S106, the brake control unit 20 may determine whether the steering angle is greater than or equal to the turning limit steering angle. For example, the brake control unit 20 may determine whether the actual steering angle acquired from the actual steering angle sensor 18 is greater than or equal to the turning limit steering angle calculated in Step S105.

If it is determined that the steering angle is greater than or equal to the turning limit steering angle (Step S106: Yes), the procedure may proceed to Step S107. In Step S107, the brake control unit 20 may determine whether the AEB is to be terminated. The determination as to whether the ABS is to be terminated may correspond to the determination as to whether the processing execution condition is satisfied.

Examples of the case where the AEB is to be terminated may include a case where the contact avoidance control is no longer to be performed due to a movement of the possible contact object, and a case where it is determined that the possible contact object has been erroneously recognized.

If it is determined that the AEB is to be terminated (Step S107: Yes), the procedure may proceed to Step S109. In Step S109, the brake control unit 20 may execute the rear-wheel precedence force decreasing process, following which the series of processes illustrated in FIG. 8 may end. In the rear-wheel precedence force decreasing process according to the example embodiment, the decreasing rate difference between the braking force applied to the front wheels and the braking force applied to the rear wheels to be used in the braking force decreasing process may be determined based on one or both of the own vehicle speed v and the steering rate (e.g., the actual steering angle) that are measured in the processing stand-by time from the timing at which the braking force condition is satisfied to the timing at which the rear-wheel precedence force decreasing process is started, as described above (refer to FIG. 6). In the rear-wheel precedence force decreasing process according to the example embodiment, the brake fluid pressure to the rear wheels and the brake fluid pressure to the front wheels may be gradually decreased so that the decreasing rate difference in the braking force determined as described above is achieved.

As illustrated in FIG. 8, if it is determined that the ABS is not being activated (Step S104: No), if it is determined that the steering angle is not greater than or equal to the turning limit steering angle (Step S106: No), or if it is determined that the AEB is not to be terminated (Step S107: No), the brake control unit 20 may cause the procedure to proceed to Step S108.

In Step S108, the brake control unit 20 may determine whether the procedure is to be terminated. For example, the brake control unit 20 may determine whether a predetermined condition for terminating the series of processes illustrated in FIG. 8 is satisfied. Examples of the predetermined condition may include a condition that the elapsed time from the determination in Step S101 that the AEB is being activated is longer than or equal to a predetermined time.

If it is determined that the predetermined condition for terminating the procedure is not satisfied and thus that the procedure is not to be terminated (Step S108: No), the brake control unit 20 may return the procedure to Step S104.

Accordingly, after it is determined that the AEB is being activated (Step S101: Yes), that the vehicle 100 is traveling on the low friction road (Step S102: Yes), and that the ESC is being disabled (Step S103: Yes), the procedure may enter a loop process to wait until it is determined that the ABS is being activated (Step S104: Yes), that the steering angle is greater than or equal to the turning limit steering angle (Step S106: Yes), and that the AEB is to be terminated (Step S107: Yes), or until it is determined that the procedure is to be terminated (Step S108: Yes).

If it is determined that the procedure is to be terminated because the above-described conditions for terminating the procedure are satisfied (Step S108: Yes), the brake control unit 20 may end the series of processes illustrated in FIG. 8.

Although some of the example embodiments of the disclosure have been described above, the disclosure is not limited to the example embodiments described above, and various modification examples may be made.

For example, in the example embodiment described above, the processing precondition may include the condition that the AEB is being activated, and the processing execution condition may include the condition that the AEB has been terminated, assuming that the vehicle 100 will exhibit the spinning behavior when the AEB is switched from the enabled state to the disabled state. However, the spinning behavior of the vehicle 100 can be caused by a braking operation performed by the driver rather than braking by the AEB.

An exemplary procedure to be performed in that case by the brake control unit 20 will now be described with reference to a flowchart illustrated in FIG. 9.

Figure 9:
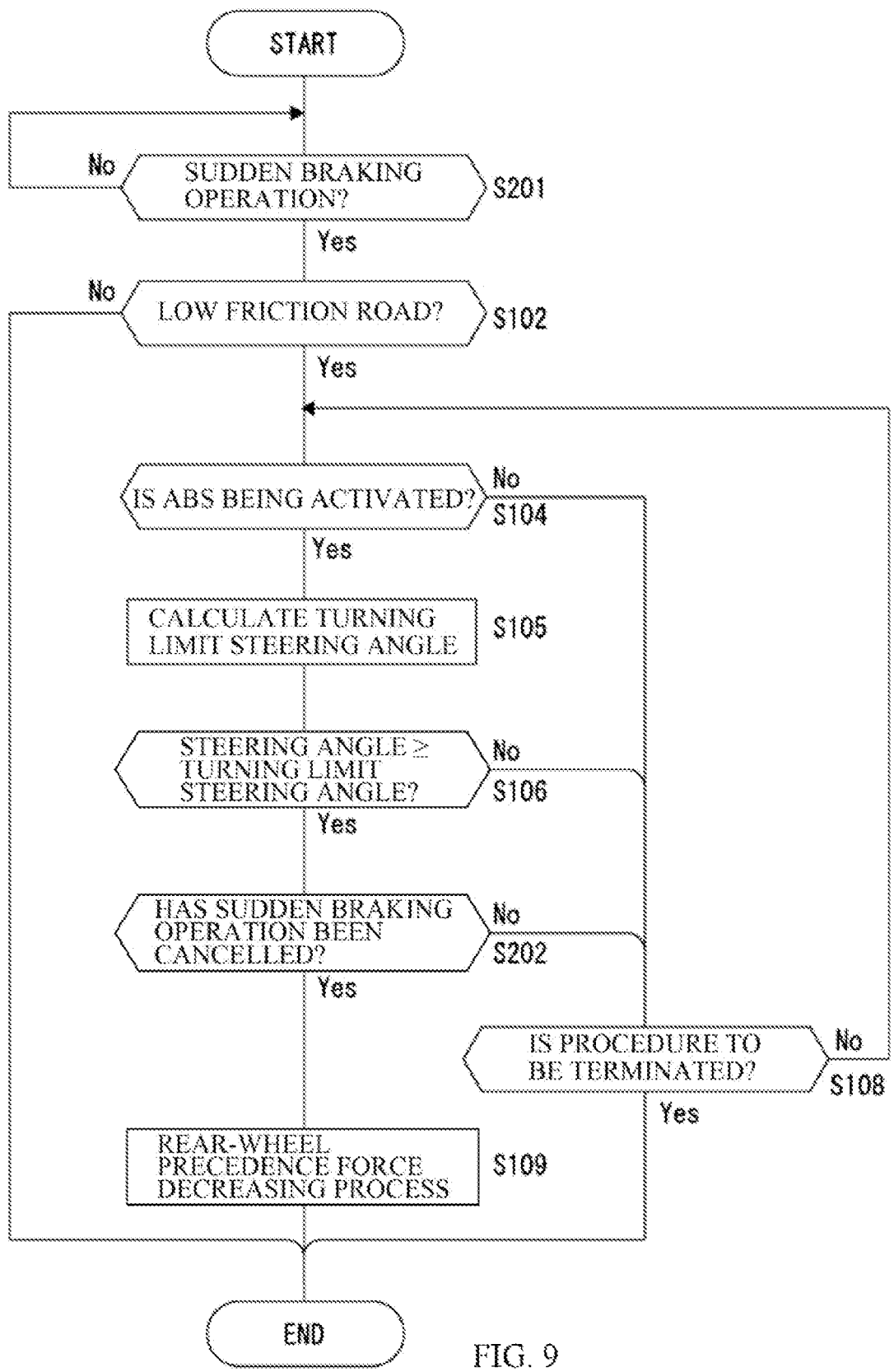
FIG. 9 is a flowchart of an exemplary procedure adapted to achieve traveling stability control according to a modification example of the disclosure.

Note that, in FIG. 9, the same processes as those described above are denoted by the same reference numerals to omit the description thereof.

First, in Step S201, the brake control unit 20 may wait until a sudden braking operation is performed by the driver. For example, the brake control unit 20 may wait until a braking operation (brake pedal operation) to apply a braking force greater than or equal to a predetermined braking force is performed by the driver. That is, the determination process at Step S201 may be a process in which the brake control unit 20 waits until the amount of depression of the brake pedal reaches a predetermined amount or greater, for example.

If it is determined that the sudden braking operation has been performed (Step S201: Yes), the brake control unit 20 may cause the procedure to proceed to Step S102. In Step S102, the brake control unit 20 may determine whether the vehicle 100 is traveling on a low friction road. If it is determined that the vehicle 100 is traveling on the low friction road (Step S102: Yes), the brake control unit 20 may cause the procedure to proceed to Step S104. In Step S104, the brake control unit 20 may determine whether the ABS is being activated.

If it is determined that the ABS is being activated (Step S104: Yes), the brake control unit 20 may execute the process at Step S105, and thereafter determine whether the steering angle is greater than or equal to the turning limit steering angle in Step S106.

If it is determined that the steering angle is greater than or equal to the turning limit steering angle (Step S106: Yes), the brake control unit 20 may determine in Step S202 whether the sudden braking operation has been cancelled. Whether the sudden braking operation has been cancelled may be determined by determining whether the amount of depression of the brake pedal is less than a predetermined amount (e.g., whether the amount of depression of the brake pedal is zero (0)), for example.

If it is determined that the sudden braking operation has been cancelled (Step S202: Yes), the brake control unit 20 may execute the rear-wheel precedence force decreasing process in Step S109, following which a series of processes illustrated in FIG. 9 may end.

If it is determined that the ABS is not being activated (Step S104: No), if it is determined that the steering angle is not greater than or equal to the turning limit steering angle (Step S106: No), or if it is determined that the sudden braking operation has not been cancelled (Step S202: No), the procedure may proceed to Step S108. In Step S108, the brake control unit 20 may determine whether the procedure is to be terminated. If it is determined that the procedure is not to be terminated (Step S108: No), the brake control unit 20 may return the procedure to Step S104. Accordingly, after it is determined that the sudden braking operation is performed (Step S201: Yes) and that the vehicle 100 is traveling on the low friction road (Step S102: Yes), the procedure may enter a loop process to wait until it is determined that the ABS is being activated (Step S104: Yes), that the steering angles is greater than or equal to the turning limit steering angle (Step S106: Yes), and that the sudden braking operation has been cancelled (Step S202), or until it is determined whether the procedure is to be terminated (Step S108: Yes).

If it is determined that the procedure is to be terminated (Step S108: Yes), the brake control unit 20 may end the series of processes illustrated in FIG. 9.

In the procedure illustrated in FIG. 9, Step S103 may be omitted, and the processing precondition may not include the condition that the ESC is being disabled. However, in this example, the process at Step S103 may be executed and the processing precondition may include the condition that the ESC is being disabled.

The traveling stability process illustrated in FIG. 9, which is based on a sudden braking operation performed by the driver, may be executed as a process in one of the modes of the ESC (e.g., a process in a stability-focused mode). In that case, the process at Step S103 may be omitted as illustrated in FIG. 9.

In the example embodiments described above, whether the braking force condition is satisfied may be determined by determining whether the ABS is being activated. Alternatively, whether the braking force condition is satisfied may be determined by determining whether the brake fluid pressure is greater than or equal to a predetermined pressure. Still alternatively, whether the braking force condition is satisfied may be determined based on the amount of depression of the brake pedal or a longitudinal acceleration. The method of determining whether the braking force condition is satisfied is not limited to a particular method.

In the example embodiments described above, the brake fluid pressure may be gradually decreased in the rear-wheel precedence force decreasing process. However, when the vehicle 100 is a HEV or an EV, the braking force may include a braking force derived from regenerative power of a motor generator, and in such a case, the braking force derived from both of the brake fluid pressure and the regenerative power may be gradually decreased in the rear-wheel precedence force decreasing process.

Further, the determination regarding the braking force described above may be performed based on not only the brake fluid pressure and also the regenerative power.

In the example embodiments described above, whether the turning condition is satisfied may be determined based on the actual steering angle. Alternatively, whether the turning condition is satisfied may be determined based on a steering torque detected by the steering torque sensor 19, the amount of a steering operation, a yaw rate, or a lateral G, for example. The method of determining whether the turning condition is satisfied is not limited to a particular method.

The turning condition may include a condition regarding the AES intervention.

In the example embodiments described above, the process adapted to recognize the external environment of the vehicle 100 in the AEB may be performed based on images captured by the camera. However, the process adapted to recognize the external environment of the vehicle 100 may be performed by another method. For example, the process adapted to recognize the external environment of the vehicle 100 may be performed using a radar or a map locator. In that case, an object which is present near the vehicle 100 may be recognized based on a position of the vehicle 100 detected by a position sensor and a high-resolution map data.

In the example embodiments described above, the precondition determination process, the execution condition determination process, and the rear-wheel precedence force decreasing process may be performed by the brake control unit 20. However, these processes may be performed by another device, such as another control unit of the vehicle control system 1, instead of the brake control unit 20.

Alternatively, these processes may be performed by multiple control units. For example, some of the processes may be performed by a first control unit, and the other processes may be performed by a second control unit.

The vehicle control system (vehicle control system 1) according to the example embodiments described above is applied to the vehicle (vehicle 100) including the braking unit configured to brake the vehicle (vehicle 100). The vehicle control system includes one or more processors (the CPU(s) of the brake control unit 20) and the one or more memories (the ROM(s) of the brake control unit 20) in which a program to be executed by the one or more processors. The program includes one or more commands adapted to cause the one or more processors to perform the precondition determination process, the execution condition determination process, and the rear-wheel precedence force decreasing process. The precondition determination process is a process adapted to determine whether the processing precondition is satisfied. The processing precondition includes at least the braking force condition that the braking force of the vehicle is greater than or equal to the predetermined braking force, and the turning condition that the turning degree of the vehicle is greater than or equal to the predetermined turning degree. The execution condition determination process is a process adapted to determine whether the processing execution condition is satisfied. The processing execution condition includes the condition that the vehicle is brought into the state where braking by the braking unit is to be cancelled while the processing precondition is being satisfied. The rear-wheel precedence force decreasing process is a process adapted to gradually decrease the braking force by decreasing a braking force applied to the rear wheel of the vehicle preferentially over a braking force applied to the front wheel of the vehicle. The rear-wheel precedence force decreasing process is performed when the second condition is satisfied.

If the braking force applied to each wheel is uniformly decreased when the vehicle 100 is brought from the state where the braking force of the vehicle is greater than or equal to the predetermined braking force and the turning degree of the vehicle is greater than or equal to the predetermined turning degree (i.e., the state where the processing precondition is satisfied) into the state where braking of the vehicle 100 is to be cancelled (i.e., when the processing execution condition is satisfied), a load is biased to the front wheels, and grip of the front wheels is recovered. This can cause oversteering of the vehicle, resulting in the spinning behavior of the vehicle. To address such a concern, according to the example embodiments described above, the rear-wheel precedence force decreasing process is performed as the process adapted to gradually decrease the braking force when the processing execution conditions described above is satisfied. In the rear-wheel precedence force decreasing process, the braking force applied to the rear wheels is decreased preferentially over the braking force applied to the front wheels.

Accordingly, when the vehicle is brought from the state where the braking force of the vehicle is greater than or equal to the predetermined braking force (i.e., where sudden braking is applied to the vehicle) and the turning degree of the vehicle is greater than or equal to the predetermined turning degree into the state where braking of the vehicle is to be cancelled, the sudden braking is cancelled so that the vehicle is prevented from occurring oversteering. This makes it possible to prevent the vehicle from exhibiting the spinning behavior.

It is therefore possible to improve the traveling stability of the vehicle.

Further, according to the vehicle control system of the example embodiments described above, the vehicle may be configured to execute, with the braking unit, the contact avoidance control (AEB or AEB+AES), the electronic stability control (ESC), and the anti-lock brake system (ABS) control. In the precondition determination process, the one or more processors may determine whether the braking force condition is satisfied by determining whether the ABS control is being activated (refer to Step S104), and whether the processing precondition is satisfied by determining whether at least four conditions are satisfied. The at least four conditions may include the condition that the contact avoidance brake control is being activated (refer to Step S101), the braking force condition, the turning condition (refer to Step S106), and the condition that the electronic stability control is being disabled (refer to Step S103). In the execution condition determination process, the one or more processors may determine whether the processing execution condition is satisfied by determining whether the vehicle has been brought into a state where the contact avoidance brake control is to be terminated (refer to Step S107).

That is, the determination as to whether the processing precondition is satisfied may be performed as the determination as to whether the at least four conditions, including the condition that the contact avoidance brake control is being activated, the condition that the ABS control is being activated, the condition that the turning degree is greater than or equal to the predetermined turning degree, and the condition that the electronic stability control is being disabled, are satisfied. Further, the determination as to whether the processing execution condition is satisfied may be performed as the determination as to whether the vehicle has been brought into the state where the contact avoidance brake control is to be switched from the enabled state to the disabled state.

The vehicle is likely to exhibit the spinning behavior when the contact avoidance control is terminated (i.e., the sudden braking state generated by the contact avoidance brake control is eliminated) in the state where the contact avoidance brake control is activated while the electronic stability control is being disabled, where the ABS control is activated in conjunction with the activation of the contact avoidance brake control, and where the turning degree is greater than or equal to the predetermined turning degree. To address such a concern, the rear-wheel precedence force decreasing process is performed in the example embodiments described above. This makes it possible to prevent the vehicle from spinning when the sudden braking state is eliminated in accordance with the termination of the contact avoidance brake control. It is therefore possible to improve the vehicle traveling stability.

JP-A No. 2015-048006 discloses a technique in which the electronic stability control is enabled when the contact avoidance brake control is activated while the electronic stability control is being disabled. The technique helps to secure vehicle behavior stability in the contact avoidance brake control.

According to the technique disclosed in JP-A No. 2015-048006, the electronic stability control is being enabled when the vehicle is brought from the state where the vehicle is in the sudden braking state due to the activation of the contact avoidance brake control and the turning degree is greater than or equal to the predetermined turning degree into the state where the contact avoidance brake control is terminated and the sudden braking state is eliminated. If the driver performs a spin avoidance driving operation to address a situation where the spinning behavior is likely to occur in the same way as in the case where the electronic stability control is disabled, the spin avoidance driving operation performed by the driver can overlap with spin prevention control performed by the electronic stability control. This can cause spinning (drifting) of the vehicle in the reverse direction. In contrast, according to the example embodiments, the electronic stability control in the disabled state is not automatically enabled in response to the activation of the contact avoidance brake control. This helps to prevent the vehicle from occurring such drifting. In this respect, it is possible to improve the vehicle traveling stability.

Further, according to the vehicle control system of the example embodiments described above, the one or more processors may determine, in the processing precondition determination process, whether the turning condition is satisfied based on the turning threshold. The turning threshold may be determined based on the braking force measured while the braking force condition is being satisfied (refer to Steps S105 and S106 in FIG. 7).

When the sudden braking state is eliminated, the vehicle is more likely to exhibit the spinning behavior as the turning degree is higher. The turning threshold for determining whether the vehicle will exhibit the spinning behavior may vary depending on the braking force at the time when the sudden braking state is eliminated. That is, the turning threshold may tend to decrease as the braking force increases. Therefore, the determination as to whether the turning condition is satisfied may be made based on the turning threshold determined based on the braking force measured while the braking force condition is satisfied, as described above.

Accordingly, it is possible to accurately determine whether the processing precondition is satisfied, that is, whether there is a possibility that the vehicle exhibits the spinning behavior when the sudden braking state is eliminated, based on the magnitude of the braking force.

Further, according to the vehicle control system of the example embodiments described above, the one or more processors may determine, in the rear-wheel precedence force decreasing process, the decreasing rate difference between the braking force applied to the front wheels and the braking force applied to the rear wheels, based on one or both of the vehicle speed of the vehicle and the turning degree of the vehicle that are measured in the time period from the timing at which the braking force condition is satisfied to the timing at which the rear-wheel precedence force decreasing process is started (refer to Step S109).

The vehicle is more likely to exhibit the spinning behavior when the vehicle speed or the turning degree is high at the timing at which the processing execution condition is satisfied, that is, at the timing at which the sudden braking state is eliminated. Thus, the decreasing rate difference between the braking force applied to the front wheels and the braking force applied to the rear wheels may be determined based on one or both of the vehicle speed and the turning degree that are measured when the processing execution condition is satisfied, as described above. Accordingly, if the vehicle is likely to exhibit the spinning behavior in association with the elimination of the sudden braking state because the vehicle speed or the turning degree is high, the decreasing rate difference between the braking force applied to the front wheels and the braking force applied to the rear wheels may be increased (i.e., the braking force decreasing rate at the rear wheel side may be increased) to prevent the vehicle from exhibiting the spinning behavior. In contrast, if the vehicle is unlikely to exhibit the spinning behavior in association with the elimination of the sudden braking state because the vehicle speed or the turning degree is low, the decreasing rate difference between the braking force applied to the front wheels and the braking force applied to the rear wheels may be decreased (i.e., the braking force decreasing rate at the rear wheel side may be decreased) to prevent the vehicle from being unnecessarily understeered. This helps to improve drivability, for example. That is, it is possible to appropriately determine the decreasing rate difference between the braking force applied to the front wheels and the braking force applied to the rear wheels depending on the likelihood of spinning of the vehicle at the time of the elimination of the sudden braking state.

Further, according to the vehicle control system of the example embodiments described above, the processing precondition includes the condition that the vehicle is traveling on a low friction road (refer to Step S102).

For example, the vehicle traveling on the low friction road such as a wet road due to rainfall, a snow road, an ice road, or a mud road is more likely to exhibit the spinning behavior when the vehicle is brought from the state where the vehicle is in the sudden braking state (i.e., where the braking force is greater than or equal to the predetermined braking force) and the turning degree is greater than or equal to the predetermined turning degree into the state where the sudden braking state is eliminated.

Therefore, the rear-wheel precedence force decreasing process according to the example embodiments described above may be performed when the vehicle is traveling on the low friction road.

The brake control unit 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the brake control unit 20 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the brake control unit 20 illustrated in FIG. 1.

The invention claimed is:

1. A vehicle control system to be applied to a vehicle, the vehicle comprising a braking unit configured to brake the vehicle, the vehicle control system comprising:
   one or more processors; and
   one or more memories in which a program to be executed by the one or more processors is stored, wherein
   the program comprises one or more commands adapted to cause the one or more processors to
     perform a first determination process to determine whether a first condition is satisfied, the first condition comprising at least a braking force condition that a braking force of the vehicle is greater than or equal to a predetermined braking force, and a turning condition that a turning degree of the vehicle is greater than or equal to a predetermined turning degree,
     perform a second determination process to determine whether a second condition is satisfied, the second condition comprising a condition that the vehicle is brought into a state where braking by the braking unit is to be cancelled while the first condition is being satisfied, and
     perform, when the second condition is satisfied, a precedence process to gradually decrease the braking force by decreasing a braking force applied to a rear wheel of the vehicle preferentially over a braking force applied to a front wheel of the vehicle.

2. The vehicle control system according to claim 1, wherein
   the vehicle is configured to execute, with the braking unit, contact avoidance brake control, electronic stability control, and anti-lock brake system control,
   the one or more processors are configured to determine, in the first determination process,
     whether the braking force condition is satisfied by determining whether the anti-lock brake system control is being activated, and
     whether the first condition is satisfied by determining whether at least four conditions are satisfied, the at least four conditions comprising a condition that the contact avoidance brake control is being activated, the braking force condition, the turning condition, and a condition that the electronic stability control is being disabled, and
   the one or more processors are configured to determine, in the second determination process, whether the second condition is satisfied by determining whether the vehicle has been brought into a state where the contact avoidance brake control is to be terminated.

3. The vehicle control system according to claim 1, wherein the one or more processors are configured to determine, in the first determination process, whether the turning condition is satisfied based on a turning threshold, the turning threshold being determined based on the braking force measured while the braking force condition is being satisfied.

4. The vehicle control system according to claim 1, wherein the one or more processors are configured to determine, in the precedence process, a decreasing rate difference between the braking force applied to the front wheel and the braking force applied to the rear wheel, based on one or both of a vehicle speed of the vehicle and the turning degree of the vehicle that are measured in a time period from a timing at which the braking force condition is satisfied to a timing at which the precedence process is started.

5. The vehicle control system according to claim 1, wherein the first condition comprises a condition that the vehicle is traveling on a low friction road.

6. The vehicle control system according to claim 2, wherein the first condition comprises a condition that the vehicle is traveling on a low friction road.

7. The vehicle control system according to claim 3, wherein the first condition comprises a condition that the vehicle is traveling on a low friction road.

8. The vehicle control system according to claim 4, wherein the first condition comprises a condition that the vehicle is traveling on a low friction road.

\* \* \* \* \*